US012179386B2

(12) United States Patent
Schmidt et al.

(10) Patent No.: US 12,179,386 B2
(45) Date of Patent: Dec. 31, 2024

(54) POWER TOOL DEBRIS MANAGEMENT

(71) Applicant: Black & Decker, Inc., New Britain, CT (US)

(72) Inventors: Benjamin Schmidt, Idstein (DE); Arthur Lauer, Idstein (DE); Lars Ohde, Idstein (DE)

(73) Assignee: Black & Decker, Inc., New Britain, CT (US)

( * ) Notice: Subject to any disclaimer, the term of this patent is extended or adjusted under 35 U.S.C. 154(b) by 268 days.

(21) Appl. No.: 16/691,028

(22) Filed: Nov. 21, 2019

(65) Prior Publication Data

US 2020/0164544 A1    May 28, 2020

(30) Foreign Application Priority Data

Nov. 28, 2018  (EP) .................................... 18208929
Jul. 9, 2019    (EP) .................................... 19185097

(51) Int. Cl.
*B28D 7/02*      (2006.01)
*B23D 45/16*     (2006.01)
*B23D 59/00*     (2006.01)
*B23Q 11/00*     (2006.01)

(52) U.S. Cl.
CPC ............... *B28D 7/02* (2013.01); *B23D 45/16* (2013.01); *B23Q 11/0046* (2013.01); *B23Q 11/0071* (2013.01); *B23D 59/006* (2013.01)

(58) Field of Classification Search
CPC . B28D 7/02; B28D 1/04; B28D 1/045; B23D 45/16; B23Q 11/0046; B23Q 11/0071

USPC ........................ 30/124; 451/456, 451; 125/20
See application file for complete search history.

(56) References Cited

U.S. PATENT DOCUMENTS 1,880,885 A * 10/1932 Dittmar .................... B23Q 1/40
                                                      83/435.11
2,789,404 A *  4/1957 Robert .................. A47L 7/0095
                                                        451/456
2,801,654 A *  8/1957 Utz ........................ B27G 19/04
                                                         30/391

(Continued)

FOREIGN PATENT DOCUMENTS

DE      3500371 A1    7/1986
DE      3525092 C2    9/1988
(Continued)

OTHER PUBLICATIONS

DE102015008579 English Translation; Muller Franz Dec. 29, 2016; B28D1/04.*

(Continued)

*Primary Examiner* — Laura M Lee
(74) *Attorney, Agent, or Firm* — Rhonda Barton

(57) ABSTRACT

A power tool including a shroud for restricting the path of debris generated by a rotatable cutting disc and defining a shroud outlet opening through which the debris can be sucked by a vacuum device. The debris enters a sub-volume along a first axis and exits the sub-volume along a second axis in a different plane. A conduit having a curved wall defines the sub-volume such that debris travelling therethough undergoes a change in direction and exits the sub-volume along a direction substantially parallel with the second axis.

16 Claims, 6 Drawing Sheets

(56) References Cited

U.S. PATENT DOCUMENTS

| | | | | |
|---|---|---|---|---|
| 3,034,493 A * | 5/1962 | Bandy | B28D 7/02 | |
| | | | 125/13.01 | |
| 4,022,182 A * | 5/1977 | Lenkevich | B23D 59/002 | |
| | | | 125/13.01 | |
| 4,163,404 A * | 8/1979 | Lavis | B23Q 1/48 | |
| | | | 83/165 | |
| 4,192,104 A * | 3/1980 | Patenaude | B24B 55/06 | |
| | | | 144/252.1 | |
| 4,905,424 A * | 3/1990 | Nagashima | B24B 55/052 | |
| | | | 451/451 | |
| 5,033,192 A * | 7/1991 | Franz | B24B 55/102 | |
| | | | 30/124 | |
| 5,146,682 A * | 9/1992 | Blochle | B23Q 11/005 | |
| | | | 30/390 | |
| 5,167,215 A * | 12/1992 | Harding, Jr. | B23D 59/006 | |
| | | | 125/13.01 | |
| 5,531,147 A * | 7/1996 | Serban | B27B 5/32 | |
| | | | 144/251.1 | |
| 5,675,895 A * | 10/1997 | Mori | B23Q 11/005 | |
| | | | 30/124 | |
| 6,108,912 A * | 8/2000 | Radigan | B23D 59/006 | |
| | | | 30/124 | |
| 7,380,343 B2 * | 6/2008 | Yoshimura | B23D 59/006 | |
| | | | 30/388 | |
| 7,526,866 B2 * | 5/2009 | Schnell | B23D 59/006 | |
| | | | 144/252.1 | |
| 7,562,456 B2 * | 7/2009 | Roehm | B23D 59/006 | |
| | | | 30/124 | |
| 7,578,063 B2 * | 8/2009 | Martin | B23D 59/006 | |
| | | | 30/124 | |
| 7,628,102 B2 * | 12/2009 | Kamiya | B23D 59/006 | |
| | | | 125/13.01 | |
| 8,037,610 B2 * | 10/2011 | Chambers | B23D 59/006 | |
| | | | 30/124 | |
| 8,056,244 B2 * | 11/2011 | Matsumoto | B27G 19/04 | |
| | | | 30/391 | |
| 8,201,335 B2 * | 6/2012 | Martin | B27B 9/02 | |
| | | | 30/124 | |
| 8,231,435 B2 * | 7/2012 | Nevin | A61C 13/12 | |
| | | | 451/67 | |
| 8,740,311 B2 * | 6/2014 | Nagasawa | E01C 23/0933 | |
| | | | 299/39.3 | |
| 9,009,982 B1 * | 4/2015 | Sedgwick | B23D 45/003 | |
| | | | 30/388 | |
| 9,267,620 B2 * | 2/2016 | Sjodahl | E02F 3/188 | |
| 9,610,704 B2 * | 4/2017 | Francis | B27G 19/04 | |
| 9,937,638 B2 * | 4/2018 | Numata | B23D 59/006 | |
| 10,293,514 B2 * | 5/2019 | Mortaro | B23D 45/024 | |
| 10,695,937 B2 * | 6/2020 | Yu | B27B 5/24 | |
| 10,751,816 B2 * | 8/2020 | Rodriguez | B23Q 11/1023 | |
| 2010/0000095 A1 * | 1/2010 | Matsumoto | B23D 59/006 | |
| | | | 30/124 | |
| 2010/0058911 A1 * | 3/2010 | Goddard | B23Q 11/06 | |
| | | | 83/478 | |
| 2010/0162571 A1 * | 7/2010 | Chambers | B23D 59/006 | |
| | | | 30/124 | |
| 2012/0200140 A1 * | 8/2012 | Nagasawa | B28D 7/02 | |
| | | | 299/39.3 | |
| 2012/0318112 A1 * | 12/2012 | Muto | B26B 25/00 | |
| | | | 83/478 | |
| 2014/0366383 A1 * | 12/2014 | Dyer | B23Q 11/127 | |
| | | | 30/123 | |
| 2016/0016270 A1 * | 1/2016 | Batres | B01D 46/0002 | |
| | | | 83/100 | |
| 2017/0232536 A1 * | 8/2017 | Rodriguez | B27G 19/02 | |
| | | | 83/171 | |
| 2018/0311861 A1 * | 11/2018 | Yu | B23D 59/006 | |
| 2018/0326515 A1 * | 11/2018 | Rodriguez | B23D 59/02 | |

FOREIGN PATENT DOCUMENTS

| | | | | |
|---|---|---|---|---|
| DE | 4230642 A1 * | 3/1994 | | B23D 59/006 |
| DE | 102010047529 A1 * | 4/2012 | | B23D 45/16 |
| DE | 102015008579 A1 | 12/2016 | | |
| EP | 1625908 B | 4/2008 | | |
| EP | 1967310 A1 | 9/2008 | | |
| EP | 1923149 B | 9/2010 | | |
| EP | 2170545 B | 4/2011 | | |
| EP | 2517824 B | 11/2013 | | |
| EP | 2915639 A1 | 9/2015 | | |
| EP | 2830826 B | 1/2017 | | |
| EP | 3113898 A | 11/2017 | | |
| EP | 2969429 B | 5/2018 | | |
| JP | S61-93206 | * | 6/1986 | B27B 9/00 |
| WO | WO-9006832 A1 * | 6/1990 | | B23D 59/006 |

OTHER PUBLICATIONS

DE-4230642-A1 English translation; Mar. 17, 1994; Hoelderlin A; B23D59/006.*

Extended European Search Report dated Aug. 1, 2020.

Communication pursuant to Article 94(3) EPC, dated Jun. 20, 2022, in corresponding European Application No. 19 185 097.3-1017.

Communication pursuant to Art 94(3) EPC, dated May 12, 2023, in corresponding European Application No. 19 185 097.3-1017.

* cited by examiner

POWER TOOL DEBRIS MANAGEMENT

CROSS-REFERENCE TO RELATED APPLICATIONS

The present application claims priority under 35 U.S.C. § 119 to European Patent Application No. 18208929.2 filed on Nov. 28, 2018 and European Patent Application No. 19185097.3 filed on Jul. 9, 2019, which are herein incorporated by reference in their entirety.

BACKGROUND OF THE INVENTION

Field of the Invention

This specification concerns the removal of debris generated by a power tool in use.

Description of the Related Art

It is known for a shroud to cover a cutting disc of a power tool to restrict the path of debris generated in use. Additionally, it is known to remove debris using a vacuum device in communication with a volume within the shroud. The health benefits of efficiently managing removal of debris (particularly dust) will be appreciated by persons skilled in the art, wherein one way of increasing the efficiency of debris removal is to increase vacuum power. Even slight improvements in the efficiency of dust removal are of interest in the field of tools because of the benefits to user health.

SUMMARY OF THE INVENTION

According to an aspect of the present invention there is provided a power tool comprising: a rotatable support arrangement for supporting at least one cutting disc and being configured to be rotatably driven by an electric motor; a shroud for restricting the path of debris generated in use and defining a shroud outlet opening through which debris can be sucked by a vacuum device; a sub-volume defined within the shroud, an outlet from the sub-volume in fluid communication with the shroud outlet opening and an inlet thereto distal to the shroud outlet opening in fluid communication with remaining volume in the shroud; wherein the inlet to the sub-volume and the outlet from the sub-volume extend along first and second axes in different planes and a conduit defining the sub-volume is configured so debris sucked through the sub-volume undergoes a change in direction by riding along a curved wall of the conduit providing that debris exits the sub-volume travelling along a direction substantially parallel with the second axis.

The first and second axes may be orthogonal.

The conduit may have components of curvature in first and second orthogonal planes for guiding debris riding therealong between the inlet and the outlet of the sub-volume.

A first component of curvature may be in a vertical plane since the outlet from the sub-volume is located higher than the inlet thereto and a second component of curvature may be along a horizontal plane.

The shroud may comprise a first shroud part and a second shroud part that are configured to move relative to each other via at least one hinge coupling for opening and closing the shroud.

The first shroud part and the second shroud part may be configured to move relative to each other via a single hinge coupling.

The conduit may be at least partially defined by a guide provided on one of the first and second shroud parts.

The guide may be coupled to one of the first and second shroud parts.

The conduit may be at least partially defined by first and second guide parts, the first guide part provided on the first shroud part and the second guide part provided on the second shroud part.

At least one of the first and second guide parts may be coupled to the shroud.

The first shroud part and the second shroud part may be maintained in a closed configuration by a securing mechanism that can be selectively released by a user.

The sub-volume may be a volume defined between an inner surface of the shroud and the guide.

The shroud outlet opening may extend through a side wall of the shroud.

The tool may be a rotary cutting tool for cutting masonry, optionally wherein the tool may be a wall chaser.

BRIEF DESCRIPTION OF THE DRAWINGS

Various aspects and embodiments of the invention will now be described by way of non-limiting example with reference to the accompanying drawings, in which.

DETAILED DESCRIPTION OF THE INVENTION

Figure 1:
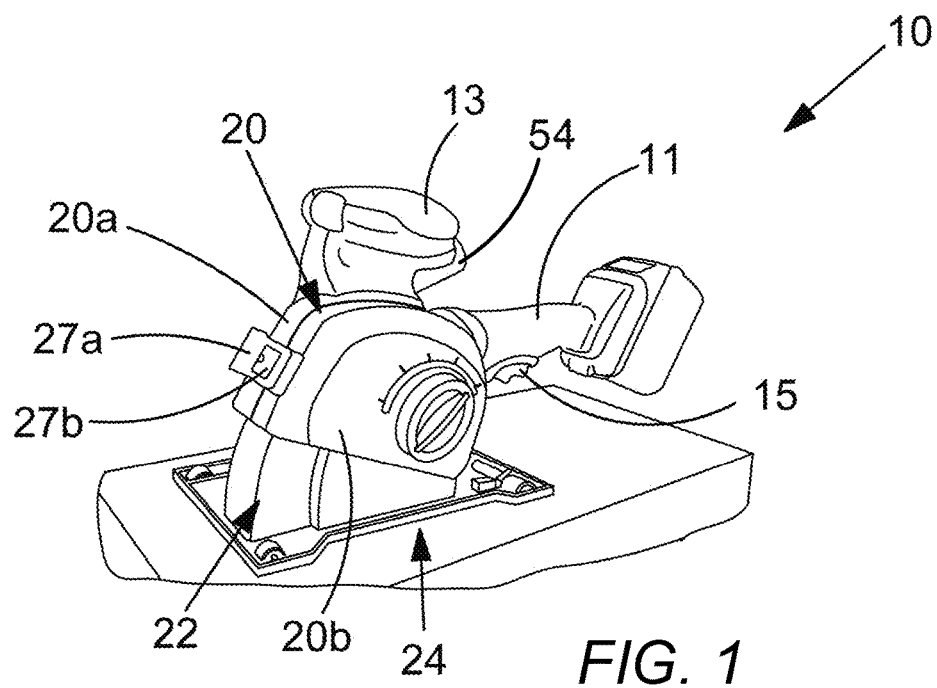
FIG. 1 illustrates a power tool according to an embodiment of the present invention in a ready-to-use configuration.
Figure 2:
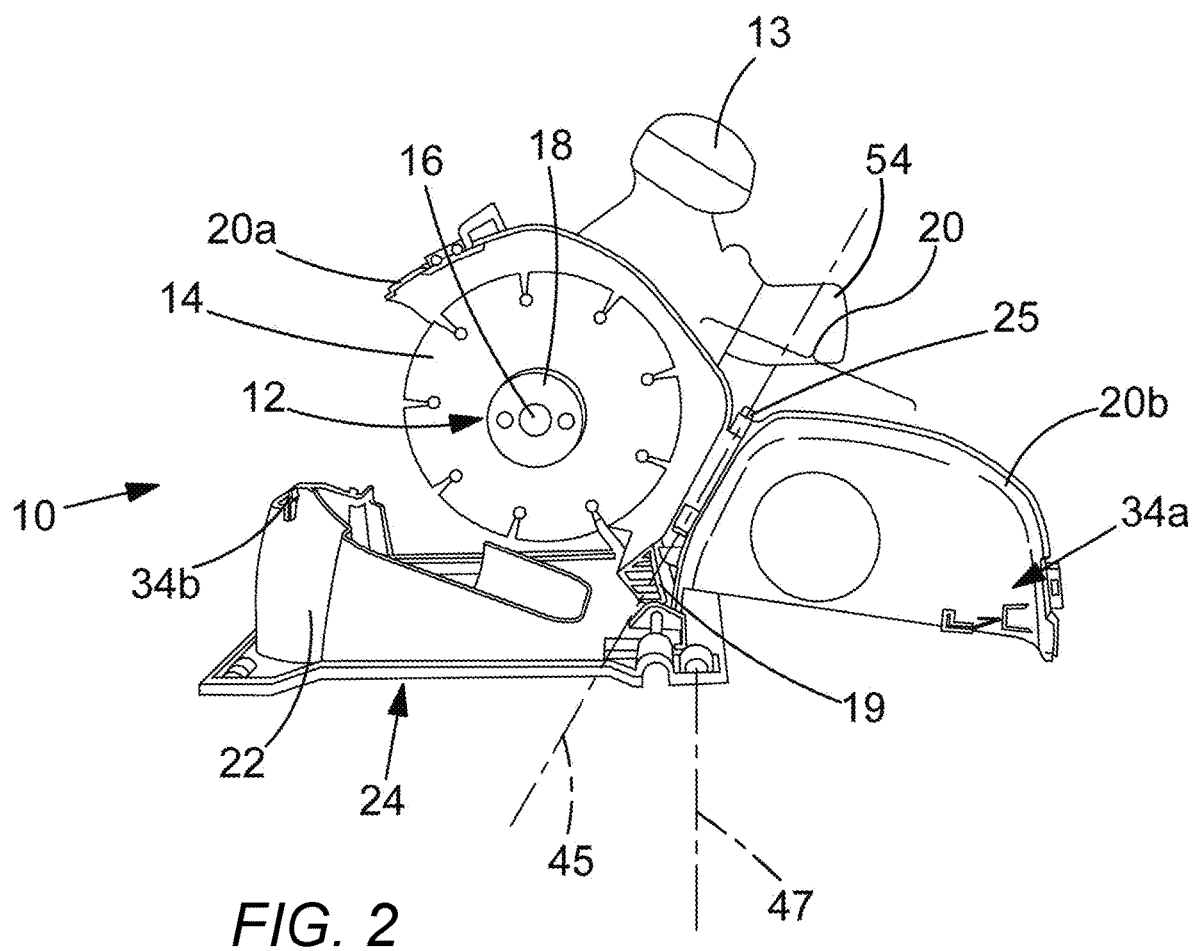
FIG. 2 illustrates the power tool of FIG. 1 in a cutting-disc-changing configuration.

FIGS. 1 and 2 illustrate a power tool, which in the embodiment described hereafter is a wall chaser 10. FIG. 1 illustrates the wall chaser 10 in a ready-to-use configuration and FIG. 2 illustrates the wall chaser 10 in a cutting-disc-changing configuration.

The wall chaser 10 has a rotatable support arrangement 12 for supporting a pair of cutting discs 14. The cutting discs 14 can be mounted to a shaft 16 of the support arrangement 12 in a manner familiar to persons skilled in the art. For example, the cutting discs 14 can be placed around the shaft 16 with a spacer element between them, wherein a nut 18 is then threaded onto the shaft 16. The action of threading the nut 18 onto the shaft 16 causes the first cutting disc to be mounted on the shaft 16 to be essentially sandwiched between a supporting flange of the wall chaser 10 and a first side of the spacer element, whereas the second cutting disc to be mounted on the shaft 16 will be essentially sandwiched between a second side of the spacer element and the nut 18. The cutting discs 14 are thus rotationally locked relative to the shaft 16 such that upon an electric motor of the wall chaser 10 causing the shaft 16 to rotate, the cutting discs 14 will be rotationally driven as well. It will be appreciated that various configurations and combinations of spacer elements can be used depending on the required distance between the cutting discs 14. For example, in another usage implementation the spacer element used could be shorter in length thereby providing a smaller distance between the cutting discs 14. Alternatively, the spacer element used could be longer in length (or more than one spacer element could be used) thereby providing a greater distance between the cutting discs 14.

An upper shroud member 20 and a lower shroud member 22 cooperate to define a volume in which the cutting discs 14 can be supported. The shaft 16 extends from an internal surface of the upper shroud member 20 such that movement of the upper shroud member 20 towards the lower shroud member 22 causes the cutting discs 14 to protrude through an opening 24 in the lower shroud member 22; this opening 24 extending through the base of the wall chaser 10 which is engaged with a work surface in use as shown in FIG. 1. In this manner the cutting discs 14 can be brought into engagement with a work surface e.g. a masonry surface in use.

Figure 3:
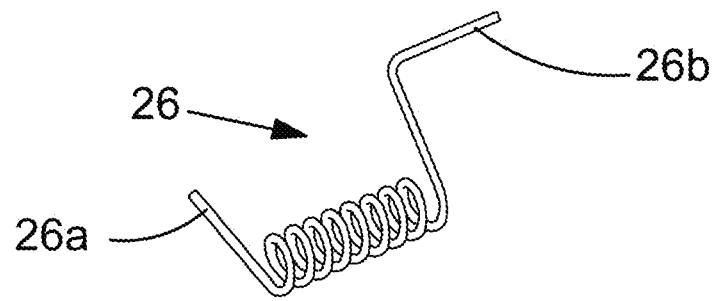
FIG. 3 illustrates a torsion spring of the power tool in FIG. 1.
Figure 4:
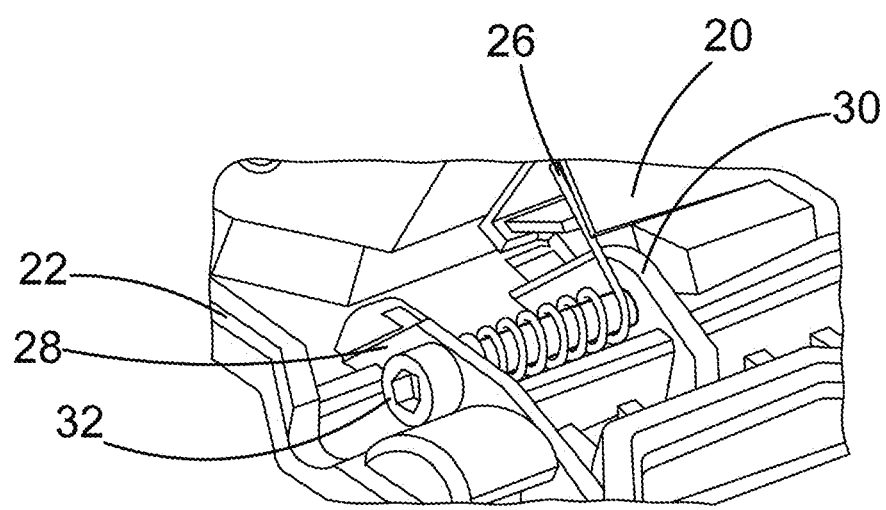
FIG. 4 illustrates the torsion spring of FIG. 3 included in the power tool of FIG. 1.

The upper shroud member 20 is pivotally coupled to the lower shroud member 22. A biasing member urges the upper shroud member 20 and the lower shroud member 22 away from each other. In this embodiment, the biasing member is a torsion spring 26, as shown in FIG. 3. With reference to FIG. 4 the lower shroud member 22 has a pair of flanges 28, 30 each having an opening extending therethrough. A bolt member 32 extends through these openings, wherein the torsion spring 26 wraps around the bolt member 32 in the space between the flanges 28, 30. A first arm 26a of the torsion spring 26 is for urging against the lower shroud member 22 and a second arm 26b of the torsion spring 26 is for urging against the upper shroud member 20. The upper shroud member 20 is pivotally coupled to the lower shroud member 22 so when a user pivots such members towards each other, the torsion spring 26 is compressed, wherein upon releasing such members the torsion spring 26 urges them apart. Looking at FIG. 2 the feature of the upper shroud member 20 which the second arm 26b of the torsion spring 26 urges against is the connecting element 19.

Referring back to FIG. 1, one hand of a user grips the primary handle 11 in use, whereas the other hand grasps secondary handle 13. Pushing downwards on the secondary handle 13 in use causes the upper shroud member 20 to pivot towards the lower shroud member 22 and the cutting discs 14 to plunge into the masonry surface to be cut. Various internal features required for the wall chaser 10 to function as heretofore described will be apparent to persons skilled in the art, including a battery for powering an electric motor and a power train for transferring torque from the electric motor to the shaft 16 for rotating the cutting discs 14. Moreover, a trigger 15 is provided on the primary handle 11 for enabling a user to selectively cause actuation of the electric motor and thereby rotation of the cutting discs 14.

The upper shroud member 20 is formed of two parts, a first shroud part 20a and a second shroud part 20b which are coupled together via a hinge coupling 25. The upper shroud member 20 can thus be reconfigured between a closed configuration as in FIG. 1 and an open configuration as in FIG. 2. The first shroud part 20a and the second shroud part 20b are maintained in a closed configuration by a securing mechanism that can be selectively released by a user. In this embodiment the securing mechanism comprises a first latch part 27a on the first shroud part 20a that can be releasably coupled to a second latch part 27b on the second shroud part 20b, but other suitable mechanisms will be apparent to persons skilled in the art.

A limiting mechanism is provided for limiting the range of pivotal movement of the upper shroud member 20 relative to the lower shroud member 22 under action of the torsion spring 26 when the upper shroud part 20 is in the closed configuration. A first part 34a of the limiting mechanism is carried by the upper shroud member 20 and a second part 34b of the limiting mechanism is carried by the lower shroud member 22.

Figure 5:
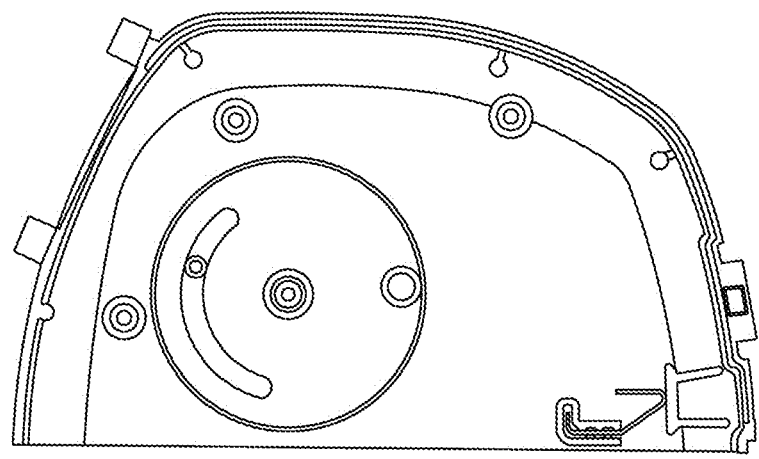
FIG. 5 illustrates a plan view of an internal surface of the second shroud part of the upper shroud member of the power tool in FIG. 1.
Figure 6:
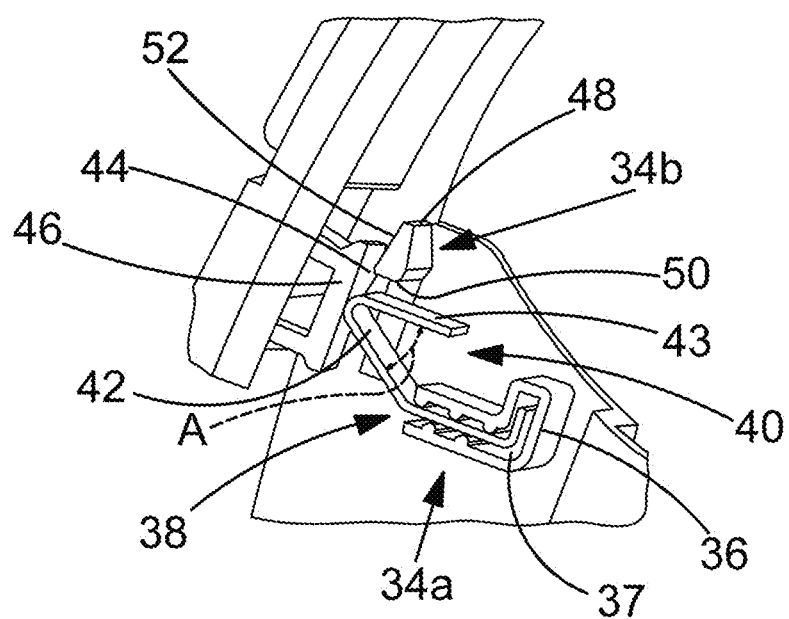
FIG. 6 illustrates how first and second parts of the limiting mechanism of the power tool in FIG. 1 cooperate in use.

With reference to FIGS. 5 and 6 the first part 34a of the limiting mechanism is provided on an internal surface of the upper shroud member 20, in the embodiment shown on the internal surface of the second shroud part 20b. The view in FIG. 6 includes a cross sectional view of the second shroud part 20b, otherwise the outer surface thereof would obscure the features extending from its internal surface. Protrusions 36 extending from the internal surface of the second shroud part 20b cooperate to define a substantially L-shaped channel 37, wherein an opening 38 is left in communication with the channel 37. A metallic spring feature 40 is received in the channel 37 and maintained therein by interference fit with the internal surfaces of the protrusions 36. The metallic spring 40 extends from the channel 37 via the opening 38.

The metallic spring 40 has a first surface or section 42 that extends from the opening 38 of the channel 37 into contact with a blocking surface 44. In this embodiment the blocking surface 44 is defined by a blocking member 46 coupled to the internal surface of the upper shroud member 20, in the embodiment shown on the internal surface of the second shroud part 20b. The metallic spring 40 also has a second surface or section 43 that extends away from the blocking surface 44. The first and second sections 42, 43 of the metallic spring 40 define an acute angle A between them. The purpose of these specific features will become apparent upon reading further.

With continued reference to FIGS. 5 and 6 the second part 34b of the limiting mechanism is carried by the lower shroud member 22 and can comprise a rigid body integrally formed with the lower shroud member 22. The rigid body forming the second part 34b has a first surface 48 and a second surface 50, wherein the second surface 50 has a larger surface area than the first surface 48. A ramped portion 52 is provided between such first and second surfaces 48, 50.

Looking at FIG. 2, consider the scenario in which a user closes the upper shroud member 20 and then urges the upper shroud member 20 towards the lower shroud member 22. This involves the user closing the first and second parts 20a, 20b of the upper shroud member 20 and securing the first latch part 27a to the second latch part 27b. Upon subsequently pivoting the upper shroud member 20 towards the lower shroud member 22, against bias of the torsion spring 26, the first section 42 of the metallic spring 40 carried by the upper shroud member 20 will be brought into engagement with the first surface 48 of the second part 34b carried by the lower shroud member 22. Upon further pivoting the upper shroud member 20 more towards the lower shroud member 22 the second part 34b cooperates with the metallic spring 40 to cause deflection of the metallic spring 40. In other words, the metallic spring 40 is caused to recoverably flex by the second part 34b thus enabling such features to move past each other. The upper shroud member 20 can thus be pivoted further towards the lower shroud member 22 by a user against bias of the torsion spring 26.

Looking at FIG. 6 the first section 42 of the metallic spring 40 is configured to be ramped relative to the first surface 48 of the second part 34b when they initially engage. This reduces the extent of deflection required by the metallic spring 40 to move past the second part 34b compared to if the first section 42 of the metallic spring 40 simply extended directly from the opening 38 along the axis of the channel 37.

With continued reference to FIG. 6 upon a user subsequently refraining from urging the upper shroud member 20 towards the lower shroud member 22 against bias of the torsion spring 26 the torsion spring 26 will urge such members apart. As the upper shroud member 20 pivots away from the lower shroud member 22 under bias of the torsion spring 26 the second section 43 of the metallic spring 40 carried by the upper shroud member 20 is brought into engagement with the second surface 50 of the second part 34b carried by the lower shroud member 22. The second surface 50 of the second part 34b thus cooperates with the metallic spring 40 to cause deflection of the metallic spring 40 in the opposite direction to that heretofore described, however, the extent of such deflection is limited by the blocking surface 44. In other words, the blocking surface 44 prevents the spring element 40 from deflecting sufficiently to enable it to move past the second part 34b as the upper shroud member 20 is pivoted away from the lower shroud member 22 under bias of the torsion spring 26. The extent of pivotal movement of the upper shroud member 20 relative to the lower shroud member 22 is thereby restricted. Moreover, the blocking surface acts as heretofore described to restrict the lower shroud member 22 from falling away from the upper shroud member 20 under gravity when a user lifts the tool up.

It is here mentioned that when the upper shroud member 20 is at its upper limit of pivotal movement away from the lower shroud member 22 (defined by engagement between the second section 43 of the metallic spring 40 and the second surface 50 of the second part 34b as heretofore described) the cutting discs 14 carried by the wall chaser 10 do not protrude through the opening 24 in the base thereof. The cutting discs 14 only protrude through the opening 24 in the base of the wall chaser 10 when a user urges the upper shroud member 20 towards the lower shroud member 22 against bias of the torsion spring 26 in use.

To enable replacement of the cutting discs 14 a user must release the first and second latch parts 27a, 27b to open the upper shroud member 20. On doing so the second shroud part 20b can be pivoted away from the first shroud part 20a about the hinge coupling 25, thereby the metallic spring 40 carried by the upper shroud member 20 is moved out of engagement with second part 34b carried by the lower shroud member 22. The heretofore described limiting mechanism is thus disengaged and the extent of pivotal movement between the upper shroud member 20 and lower shroud member 22 is increased. In the open configuration of the upper shroud member 20, when a user holds the wall chaser 10 from only the secondary handle 13 the lower shroud part 22 pivots away from the upper shroud part 20 under the influence of gravity and bias of the torsion spring 26.

With further reference to FIG. 2 when the upper shroud part 20 is in the open configuration, parts of the wall chaser 10 can pivot about two axes of freedom. The first such axis 45 is defined by the hinge coupling 25 and the second such axis 47 is defined by the pivotal connection between the upper and lower shroud members, wherein such axes are orthogonal relative to each other. Users of the wall chaser 10 are thus provided with quick and easy access to the cutting discs 14 mounted to the shaft 16 for facilitating their replacement or otherwise e.g. changing the distance between the cutting discs 14 by modifying the arrangement of spacer elements heretofore described which will be familiar to persons skilled in the art. Also, since features of the wall chaser 10 merely hinge apart to enable blade replacement the risk of a user losing a feature or not reassembling it correctly is reduced.

Lastly it is pointed out that after a cutting disc replacement operation the wall chaser 10 can be reconfigured into its ready-to-use configuration illustrated in FIG. 1 in multiple ways. For example, starting from the configuration illustrated in FIG. 2 a user may secure the first and second shroud parts 20a, 20b of the upper shroud member 20 and then urge the upper shroud member 20 towards the lower shroud member 22 to engage the limiting mechanism as heretofore described.

Alternatively, starting from the configuration illustrated in FIG. 2 a user may urge the first shroud member 20 towards the lower shroud member 22 against the torsion spring 26 by pushing down on the secondary handle 13. Subsequently the user may then secure the first and second shroud parts 20a, 20b of the upper shroud member 20 together before releasing the pressure exerted against the torsion spring 26. On releasing such pressure, the upper shroud member 20 will be pivoted away from the lower shroud member 22 by the torsion spring 26, thereby engaging the second section 43 of the metallic spring 40 with the second surface 50 of the rigid member 34b for restricting further pivotal movement of the shroud members away from each other under bias of the torsion spring (and gravity when the tool is lifted).

In some embodiments the blocking surface 44 is not defined by a blocking member 46 coupled to the internal surface of the upper shroud member 20, whereas instead it is merely an internal surface of the shroud part which carries the metallic spring 40 e.g. the inner surface of the shroud part or a flange integrally formed with the shroud part. In some embodiments the blocking surface 44 is a rib integrally formed with the upper shroud member 20 and extending from an inner surface thereof.

Although the first and second heretofore mentioned axes 45, 47 defining the degrees of freedom of movement of respective features of the wall chaser 10 have been described as being orthogonal relative to each other, in some embodiments this need not necessarily be the case provided the wall chaser 10 can be opened and closed in substantially the same manner for cutting disc replacement i.e. opening the upper shroud member 20 disengages the limiting mechanism.

Looking at FIG. 2 the connecting element 19 couples directly to the first shroud part 20a of the upper shroud member 20, thus providing that only the second shroud part 20b moves about the hinge connection 25. In some embodiments the connecting element 19 may be shaped such that both the first shroud part 20a and the second shroud part 20b are separately coupled thereto about respective hinge couplings. In other words, the first shroud part 20a may be coupled to the connecting element 19 via a first hinge coupling and the second shroud part 20b may be coupled to the connecting element 19 via a second hinge coupling; thereby providing that in such embodiments both the first and second shroud parts 20a, 20b can be hingedly moved relative to each other in order to open the upper shroud member 20.

Although the protrusions 36, metallic spring 40 and blocking surface 44 have been described as carried by the upper shroud member 20; and the second part 34b has been described as carried by the lower shroud member 22; it will be appreciated that such an arrangement could be reversed.

For example, the protrusions 36, the metallic spring 40 and the blocking surface 44 could alternatively be carried by the lower shroud member 22; and the second part 34b could alternatively be carried by the upper shroud member 20 provided that the second part 34b is capable of being disengaged from the metallic spring 40 when the shroud parts of the upper shroud member 20 are opened relative to each other.

In some embodiments the spring feature 40 need not necessarily be metallic and could be plastic or rubber for example, provided it is able to perform the same function as the metallic spring 40 heretofore described.

Although the foregoing embodiments are described as including a torsion spring 26 for urging the upper shroud member 20 away from the lower shroud member 22 in some embodiments, an alternative biasing member could be used such as a cap spring, coil spring, clock spring or pressure spring.

Figure 7:
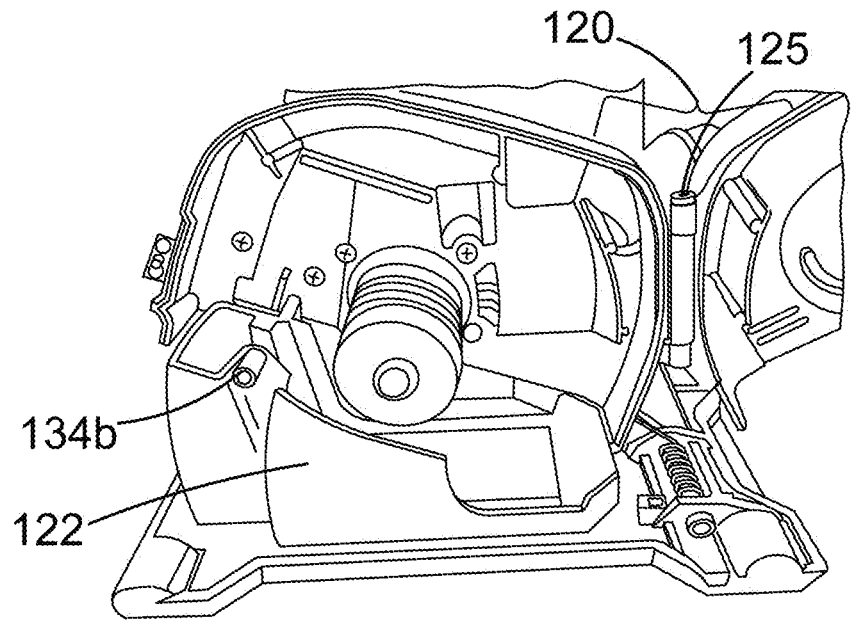
FIGS. 7 and 8 illustrate features of the limiting mechanism of a second embodiment.
Figure 8:
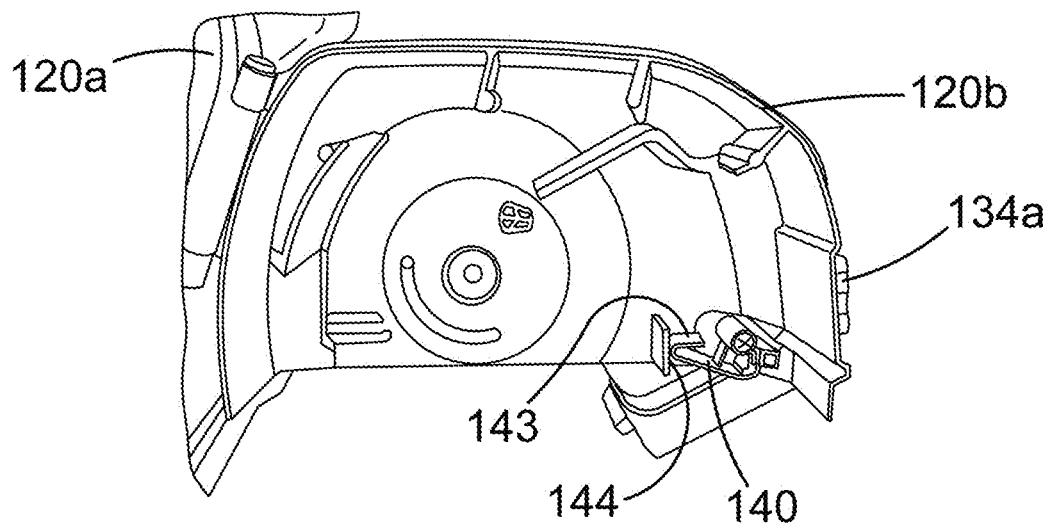

It will be appreciated that in other embodiments, respective features need not necessarily have the same shape and configuration of the parts heretofore described provided they achieve the same function. For example, with reference to FIGS. 7 and 8 (wherein like features are denoted with similar reference numerals to those used up to now but increased by 100) in one embodiment the second part 134b of the limiting mechanism carried by the lower shroud member 122 may be a rod or pin extending from the lower shroud member 122. As for the first part 134a of the limiting mechanism carried by the upper shroud member the metallic spring feature of spring 140 cooperates with a blocking surface 144 formed by a rib extending from an internal surface of the second shroud part 120b. Upon closing the first and second shroud parts 120a, 120b and pushing the upper shroud member 120 towards the lower shroud member 122 against spring bias as heretofore described, the rod or pin will cooperate with the metallic spring portion 140 causing it to deflect and move past the rod or pin and spring back to its original configuration. Upon a user refraining from pushing the upper shroud member 120 towards the lower shroud member 122 the spring bias will cause a section 143 of the metallic spring 140 to engage the rod or pin which will urge it into contact with the blocking surface 144, thereby restricting the spring bias from being able to urge the upper and lower shroud members 120, 122 apart. Moreover, the blocking surface 144 acts as to restrict the lower shroud member 122 from falling away from the upper shroud member 120 under gravity when a user lifts the tool up. The mechanism can be released by opening the upper shroud member 120 via the hinge opening 125.

Although the foregoing is described in the specific context of a wall chaser 10 it will be appreciated that the teachings herein could be applied in the context of other power tools having rotatable cutting discs that are shielded from user access in use but that a user must have access to in order to replace them, e.g. circular saw power tools. It will thus further be appreciated that in some embodiments the power tool in which the foregoing teachings are applied could have only a single cutting disc.

Referring back to FIGS. 1 and 2 how debris is removed in use will be discussed in detail. The wall chaser 10 has a vacuum device attachment 54, which defines a channel in fluid communication with the volume defined by the upper and lower shroud members 20, 22. When the wall chaser 10 is grinding a concrete surface and thereby generating debris in the form of dust a vacuum device coupled to the vacuum device attachment 54 will be able to suck dust from within said volume, thereby drawing it away from the cutting discs 14 and into a storage of the vacuum device. The efficient removal of dust is very important due to the adverse health effects which can occur in the event of users being exposed to dust. Therefore even slight improvements in the efficiency of dust removal are of interest in the field of tools.

Figure 9:
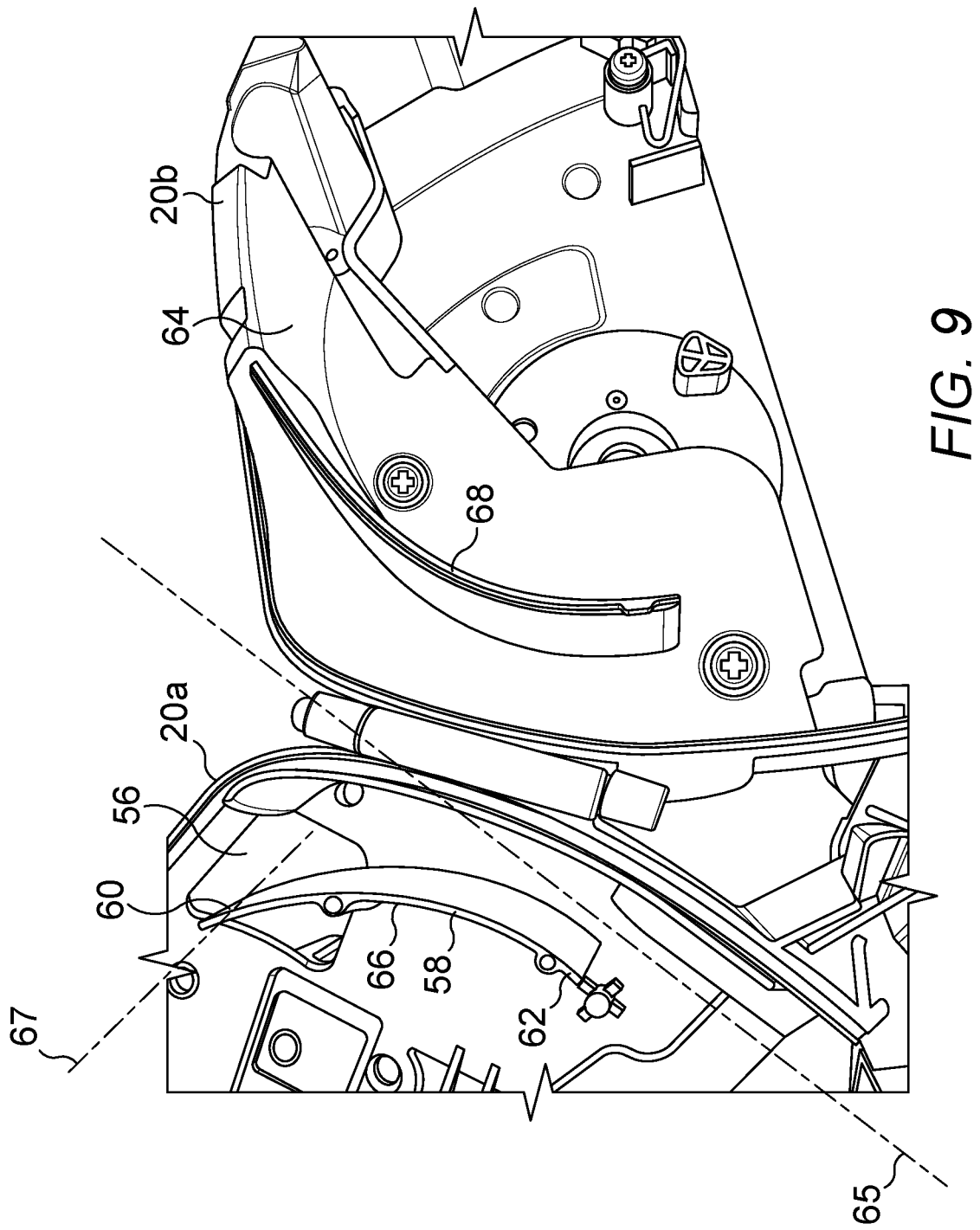
FIG. 9 illustrates the shroud in an open configuration.

With additional reference to FIG. 9, in which the vacuum device attachment 54 is not shown, the heretofore described wall chaser 10 is shown in an open configuration. The first shroud part 20a has a hole 56 in its side, which is referred to hereafter as the shroud outlet opening 56. In use, dust is sucked though the shroud outlet opening 56 on route to a vacuum device. When the first and second shroud parts 20a, 20b are in a closed configuration relative to each other the shroud outlet opening 56 is in a side wall of the upper shroud member 20.

A first guide part 58 provided on the internal wall of the first shroud part 20a defines a substantially arc-like shape. A top end 60 is located proximal the shroud outlet opening 56 and a bottom end 62 is located distal to the shroud outlet opening 56. A second guide part 64 is provided on the internal wall of the second shroud part 20b and is configured to cooperate with the first guide part 58. More specifically when the first and second shroud parts 20a, 20b of the upper shroud member 20 are in a closed position an edge 66 defined by the first guide part 58 engages an edge 68 defined by the second guide part 64. The first guide part 58, the second guide part 64 and the internal wall of the upper shroud member 20 then cooperate to define a conduit which is the boundary of a sub-volume within the overall volume encompassed by the shroud (the shroud being the combination of the upper and lower shroud members 20, 22). From FIG. 9 it will be apparent that when the first and second shroud parts 20a, 20b are in a closed position an outlet from the sub-volume is in fluid communication with the shroud outlet opening 56 and an inlet to the sub-volume is distal to the shroud outlet opening 56 in fluid communication with remaining volume encompassed by the shroud.

Surface features of the conduit are configured to facilitate the removal of dust from within the shroud as will be discussed below.

With continued reference to FIG. 9 the inlet to the sub-volume extends along a first axis 65 (in the plane of the page) but the shroud outlet opening 56 in the side of the shroud extends along a second axis 67 (extending out of the page), meaning that the first axis 65 and the second axis 67 are in different planes relative to each other.

When negative air pressure is applied to the shroud outlet opening 56 for drawing dust away from the vicinity of the cutting discs 14 in use, dust rides along walls of the conduit defining the sub-volume on route to the shroud outlet opening 56. Dust is required to change its direction of travel by substantially 90 degrees on route from within the shroud 20, firstly upon entering the sub-volume by travelling substantially along the first axis 65 and then by exiting the sub-volume through the shroud outlet opening 56 by travelling substantially along the second axis 67. Walls of the conduit guide dust as it travels along the sub-volume and cause it to change direction.

In particular, the second guide part 64 has two components of curvature, namely a vertical component of curvature since the outlet from the sub-volume is higher than the inlet thereto and also a horizontal component of curvature for twisting towards the side wall of the upper shroud member 20 defining the shroud outlet opening 56. Overall the second guide part 64 twists upwards and sidewards from the inlet to the sub-volume to the shroud outlet opening 56, essentially defining part of a helix. The second guide part 64 is thus configured so that dust contacting the second guide part 64 upon being sucked along the sub-volume has its direction of travel changed so that it exits the shroud outlet opening 56 travelling substantially horizontally.

Figure 10:
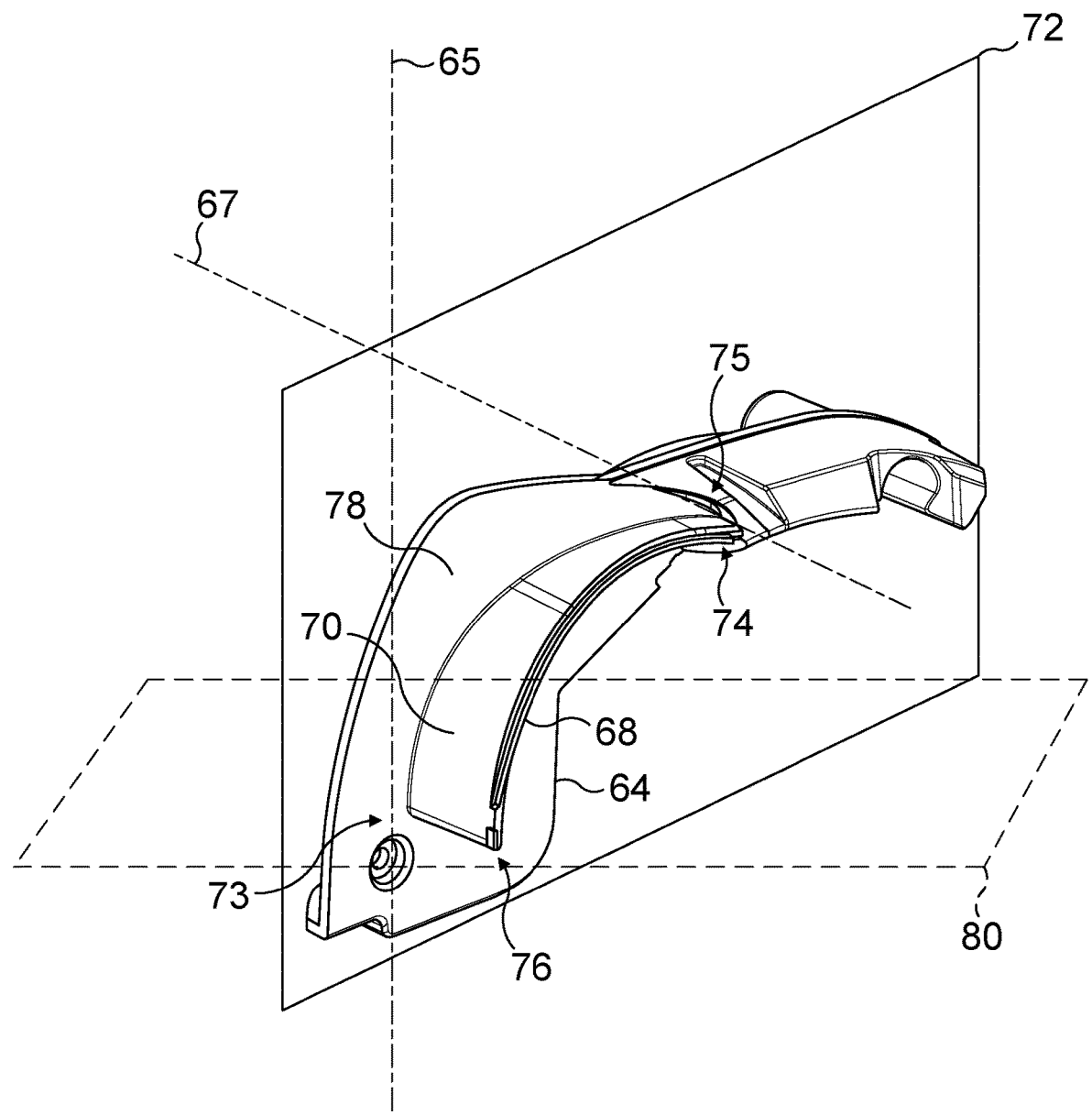
FIG. 10 illustrates a dust guide part.

FIG. 10 shows the second guide part 64 in isolation, wherein a primary guide section 70 defines a substantially arc-like shape. The edge of the primary guide section 70 is the edge 68 already described in connection with FIG. 9. The primary guide section 70 is curved in a vertical plane 72, wherein a top end 74 thereof is located closer to the shroud outlet opening 56 in use than a bottom end 76 thereof. A secondary guide section 78 is curved in a horizontal plane 80, providing that the width of the upper surface of the primary guide section 70 gradually narrows from the bottom end 76 of the primary guide section 70 to the top end 74 thereof. A bottom end 73 of the secondary guide section 78 extends parallel to the first axis 65, whereas a top end 75 of the secondary guide section 78 extends parallel to the second axis 67. The purpose of this configuration is to urge dust in a direction towards the shroud outlet opening 56. In other words it is here stated that due to the curvature of the secondary guide section 78, the secondary guide section 78 sweeps across the primary guide section 70 between the bottom ends and top ends thereof.

It is realised that in use not all dust sucked through the sub-volume on route to the shroud outlet opening 56 will ride along the secondary guide section 78 of the second guide part 64. However, to the extent that dust does impact the secondary guide section 78, such dust will ride along the secondary guide section 78 and undergo a change in direction such that it rides off the top end 75 of the secondary guide section 78 travelling in a direction substantially parallel to the second axis 67.

Since removal of dust from the shroud is facilitated by features of the wall chaser 10 itself, efficiency of dust removal for a given degree of suction power is improved.

It will be appreciated that the first and second guide parts 58, 64 do not need to have the specific shape illustrated in FIGS. 9 and 10 and that there is some flexibility regarding different configurations provided that the same function is achieved. For example, in some embodiments the primary guide section 70 and the secondary guide section 78 may continuously merge into each other in a gradual manner, instead of defining a step-like interface therebetween as illustrated in FIG. 10.

In some embodiments the first guide part 58 may comprise an integral part of the first shroud member 20a but in other embodiments it may be coupled thereto and be formed of plastic for example. Furthermore, in some embodiments second guide part 64 may comprise an integral part of the second shroud member 20b but in other embodiments it may be coupled thereto and be formed of plastic for example.

In some embodiments instead of first and second guide parts 58, 64 a single guide part is provided. This single guide part is provided on either the first or second shroud part 20a, 20b of the upper shroud member 20 so that when the upper shroud member 20 is closed the single guide part engages the inner wall of the other shroud part 20a, 20b to define the heretofore described conduit and thereby the sub-volume. Such a single guide part may comprise an integral part of the first or second shroud member 20a, 20b but in other embodiments it may be coupled thereto and be formed of plastic for example.

Although the conduit has been described as being formed by cooperating features of a guide and internal surfaces of the shroud, in some embodiments the conduit may comprise a feature which itself defines the sub-volume and which is coupled to the first or second shroud part 20a, 20b of the upper shroud member 20. For example, such a feature may comprise a tubular member or otherwise, one end of which communicates with the shroud outlet opening 56 and the other end of which communicates with remaining volume within the shroud.

It is again mentioned that although the foregoing is described in the specific context of a wall chaser 10 it will be appreciated that the teachings herein could be applied in the context of other power tools having rotatable cutting discs that are shielded from user access in use but that a user must have access to in order to replace them, e.g. circular saw power tools. Such power tools may not have a shroud comprising of upper and lower shroud members as heretofore described but may instead have a single shroud which can be hinged open similar to the upper shroud member 20. Debris being sucked from within such a shroud may be wood chips instead of dust, although the specific type of debris generated depends on the use context of the tool.

Finally, it will be appreciated that whilst various aspects and embodiments have heretofore been described the scope of the present invention is not limited thereto and instead extends to encompass all arrangements, and modifications and alterations thereto, which fall within the spirit and scope of the appended claims.

What is claimed is:

1. A power tool comprising:
a rotatable support arrangement for supporting at least one cutting disc and being configured to be rotatably driven by an electric motor;
a shroud for restricting the path of debris generated in use and defining a shroud outlet opening through which debris can be sucked by a vacuum device, the shroud having an internal surface;
a guide part mounted to the internal surface of the shroud, the guide part having a curved wall that projects outwardly therefrom, the curved wall forming a portion of a conduit;
a sub-volume defined within the shroud, an outlet from the sub-volume in fluid communication with the shroud outlet opening and an inlet thereto distal to the shroud outlet opening in fluid communication with remaining volume in the shroud;
wherein the inlet to the sub-volume and the outlet from the sub-volume extend along first and second axes in different planes and the conduit, which defines, the sub-volume is configured so debris sucked through the sub-volume undergoes a change in direction by riding along the curved wall providing that debris exits the sub-volume travelling along a direction substantially parallel with the second axis, the curved wall of the conduit having a body that gradually narrows from the inlet to the outlet and defines part of a helix.

2. The power tool of claim 1, wherein the first and second axes are orthogonal.

3. The power tool of claim 2, wherein the conduit has components of curvature in first and second orthogonal planes for guiding debris riding therealong between the inlet and the outlet of the sub-volume.

4. The power tool of claim 3, wherein a first component of curvature is in a vertical plane since the outlet from the sub-volume is located higher than the inlet thereto and a second component of curvature is along a horizontal plane.

5. The power tool of claim 1, wherein the shroud comprises a first shroud part and a second shroud part that are configured to move relative to each other via at least one hinge coupling for opening and closing the shroud.

6. The power tool of claim 5, wherein the first shroud part and the second shroud part are configured to move relative to each other via a single hinge coupling.

7. The power tool of claim 5, wherein the conduit is at least partially defined by the guide part provided on one of the first and second shroud parts.

8. The power tool of claim 7, wherein the guide part is coupled to one of the first and second shroud parts.

9. The power tool of claim 7, wherein the sub-volume is a volume defined between an inner surface of the shroud and the guide part.

10. The power tool of claim 5, wherein the guide part comprises first and second guide parts, and
   wherein the conduit is at least partially defined by the first and second guide parts, the first guide part provided on the first shroud part and the second guide part provided on the second shroud part.

11. The power tool of claim 10, wherein at least one of the first and second guide parts are coupled to the shroud.

12. The power tool of claim 5, wherein the first shroud part and the second shroud part are maintained in a closed configuration by a securing mechanism that can be selectively released by a user.

13. The power tool of claim 1, wherein the shroud outlet opening extends through a side wall of the shroud.

14. The power tool of claim 1, wherein the power tool is a rotary cutting tool for cutting masonry.

15. The power tool of claim 1, wherein the power tool is a wall chaser.

16. The power tool of claim 1, wherein the shroud comprises an upper shroud member pivotally coupled to and biased away from a lower shroud member.

* * * * *